(12) United States Patent
Chen et al.

(10) Patent No.: US 8,494,102 B2
(45) Date of Patent: Jul. 23, 2013

(54) METHODS AND APPARATUS FOR ORTHOGONAL MODULATED SIGNALS

(75) Inventors: Weizhong Chen, Austin, TX (US); Leo G. Dehner, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 364 days.

(21) Appl. No.: 12/807,591

(22) Filed: Sep. 9, 2010

(65) Prior Publication Data
US 2012/0063503 A1 Mar. 15, 2012

(51) Int. Cl.
*H04B 1/10* (2006.01)
(52) U.S. Cl.
USPC .......................................... 375/350; 375/324
(58) Field of Classification Search
USPC ................. 375/347–350, 229–230, 147–148, 375/324
See application file for complete search history.

(56) References Cited

U.S. PATENT DOCUMENTS

| | | | | | |
|---|---|---|---|---|---|
| 5,859,877 | A | * | 1/1999 | Betts et al. | 375/298 |
| 5,956,373 | A | * | 9/1999 | Goldston et al. | 375/298 |
| 6,088,389 | A | * | 7/2000 | Larsson | 375/231 |
| 6,535,553 | B1 | * | 3/2003 | Limberg et al. | 375/232 |
| 2002/0008573 | A1 | * | 1/2002 | Kunieda et al. | 329/304 |
| 2004/0165653 | A1 | * | 8/2004 | Jayaraman et al. | 375/148 |
| 2009/0207947 | A1 | * | 8/2009 | Strodtbeck et al. | 375/340 |
| 2009/0279422 | A1 | * | 11/2009 | Fonseka et al. | 370/215 |
| 2010/0219080 | A1 | * | 9/2010 | Webb et al. | 205/219 |

OTHER PUBLICATIONS

"Voice Capacity Evolution with Orthogaonal Subchannels", Nokia, 3GPP TSG-Geran #36, GP-071792, Nov. 12-16, 2007, p. 1-12.
"Speech Capacity Enhancemenst Using DARP", Qualcomm, 3GPP YDG-Geran 336, GP-071738, Nov. 12-16, 2007, p. 1-4.
"Adaptive Symbol Constellation for Muros (Downlink)", Telefon ABLM Ericsson, #GPP TSG Geran #37, GP-080114, Feb. 18-22, 2008, p. 1-12.
"Sub Channel specific Power Control for Orthogonal Sub Channels", Nokia, #GPP TSG Geran #37, Tdoc GP-080171, Feb. 18-22, 2008, p. 1-3.

* cited by examiner

*Primary Examiner* — Emmanuel Bayard

(57) ABSTRACT

Methods and corresponding systems for providing and demodulating an orthogonal modulated signal where demodulation includes separating a sampled orthogonal modulated signal into in phase and quadrature samples, deriving first and second equalizer coefficients based on corresponding in phase and quadrature samples and further, respectively, based on a first and second training sequence, programming a first plurality of equalizer filters with the first equalizer coefficients and a second plurality of equalizer filters with the second equalizer coefficients; and processing, after programming with first and second coefficients, the in phase samples and the quadrature samples through a first and second plurality of equalizer filters to provide demodulated symbols.

23 Claims, 4 Drawing Sheets

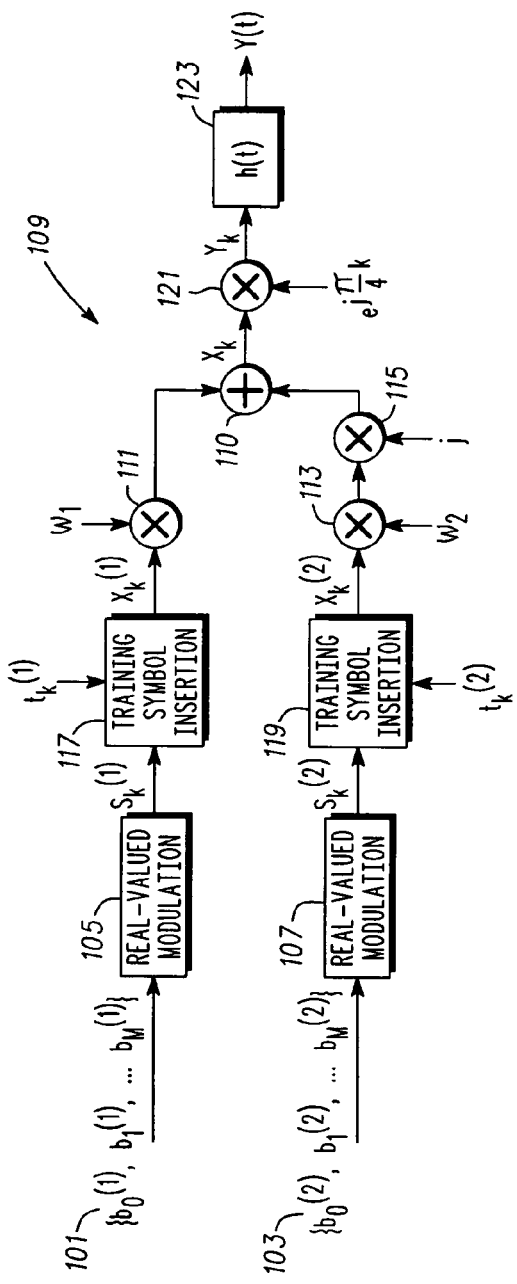
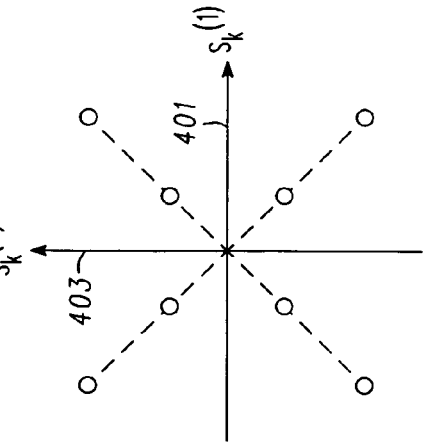
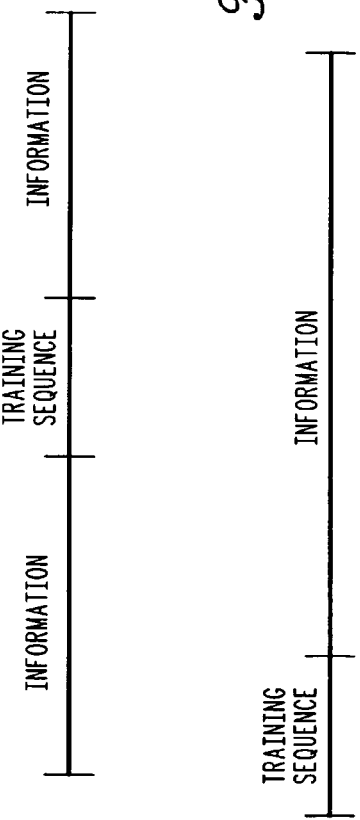

METHODS AND APPARATUS FOR ORTHOGONAL MODULATED SIGNALS

FIELD OF THE INVENTION

This invention relates in general to communications technologies and more specifically to techniques and apparatus for orthogonal modulated signals.

BACKGROUND OF THE INVENTION

In some communications systems, e.g., cellular phone systems, frequency reuse is employed wherein cell cites will reuse a given frequency once they are deemed to be sufficiently geographically isolated from other cells using that frequency. For maximum capacity cell sites have been shrinking and cell sites that use the same frequency are getting closer to each other, thereby increasing co-channel interference. In other systems such as non-licensed ISM (Industrial, Scientific, Medical) bands where short range services such as Bluetooth and WiFi operate co-channel interference can be even more challenging.

One approach that is used to mitigate co-channel interference has been receiver antenna diversity. This will often enhance the desired signal and attenuate the co-channel interference. However, receiver antenna diversity may be costly and the extra antenna may be burdensome.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 depicts in a simplified and representative form, a high level diagram of a modulation system to provide an orthogonal modulated signal in accordance with one or more embodiments;

FIG. 2 and FIG. 3 illustrate in a representative form approaches for inserting a training sequence in an information stream;

FIG. 4 depicts a representative diagram of a constellation map for an orthogonal modulated signal;

DETAILED DESCRIPTION

Figure 5:
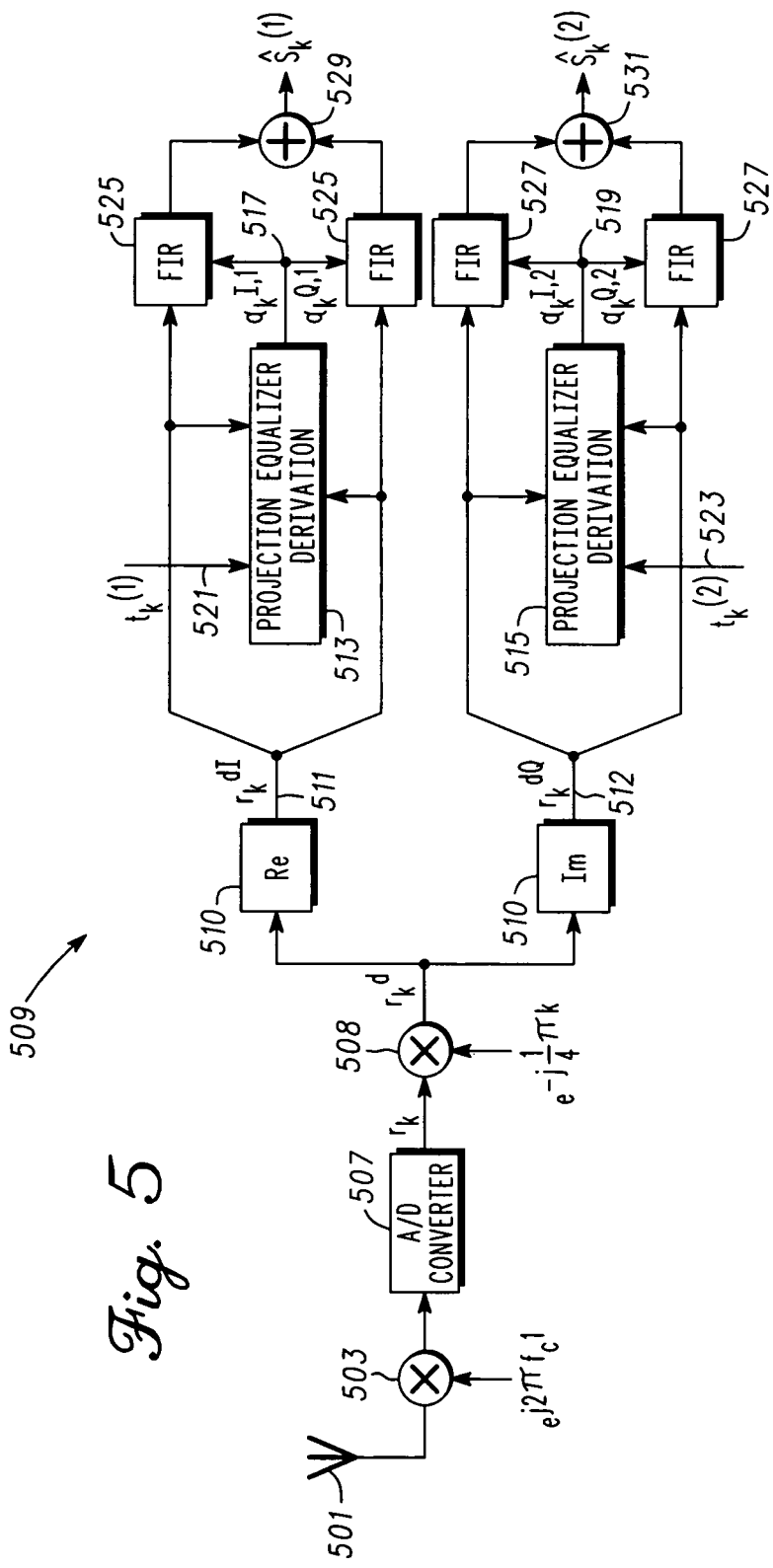
FIG. 5 depicts a representative high level receiver system in accordance with one or more embodiments.

In overview, the present disclosure concerns communication technologies and more specifically techniques and apparatus for providing and using orthogonal modulated signals that are arranged and constructed for increasing capacity for a given level of interference or decreasing interference and so on. More particularly various inventive concepts and principles embodied in methods and apparatus which utilize orthogonal modulated signals employing a plurality of information streams will be discussed and disclosed.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Referring to FIG. 1, a simplified and representative high level diagram of a modulation system in accordance with one or more embodiments will be briefly discussed and described. In FIG. 1, a system is arranged and configured to provide an orthogonal modulated signal using a plurality of bit streams, i.e., the system executes a method of providing the orthogonal modulated signal. The FIG. 1 system is ordinarily a part of a transmission system or the like. The FIG. 1 system can be implemented in a processor and this processor can be hardware or software or a combination of hardware and software based. A typical Digital Signal Processor or the like is one approach to implementing the FIG. 1 system.

A first bit stream 101 and a second bit stream 103 are provided, e.g., from a data application, vocoder, etc. of some form. These bit streams are converted to first real valued or in phase (non complex) symbols by modulator 105 and second real valued or in phase symbols by modulator 107. The balance of the modulation system of FIG. 1 includes a combiner 109 that generates a complex orthogonal modulated signal, $x_k$, at the output of adder 110 by orthogonally combining respective ones of the first in phase symbols and the second in phase symbols.

The modulation system further comprises in some embodiments a first amplifier or multiplier 111 and a second amplifier or multiplier 113 or other weighting approaches, which operate to weight or for weighting each of the first in phase symbols and each of the second in phase samples with respective first and second weights, $w_1$, $w_2$, as part of the generating the complex orthogonal modulated signal. Also as illustrated the combiner 109 includes a multiplier 115 which is arranged to or for multiplying each of the second in phase samples by the quadrature operator, j, to thereby provide the orthogonality between the first and second in phase samples.

As well be discussed in further detail below, one or more embodiments of the modulators operate to or for converting the first bit stream to first in phase symbols and the second bit stream to second in phase symbols by assigning symbols using independent quaternary modulation. In some embodiments this further comprises independently assigning one of four real value symbols to each pair of bits in the first bit stream and in the second bit stream. Further as illustrated a first training sequence inserter 117 and a second training sequence inserter 119 are, respectively arranged to insert or for inserting a first training symbol sequence, $t_k^{(1)}$, in the first in phase symbols and a second training symbol sequence, $t_k^{(2)}$, in the second in phase symbols. These training sequences can be used by a receiver to facilitate symbol estimation. As further noted below a rotator or multiplier 121 and filter 123 may be used.

Somewhat more rigorously given the two bit-streams $\{b_k^{(1)}, b_k^{(2)}\}$, 101, 103 where $b_k^{(1)}$ and $b_k^{(2)}$ takes on values of 0 or 1. The modulators 105, 107 can perform independent binary modulation for $b_k^{(1)}$ and $b_k^{(2)}$, which results in the following two real-valued symbol sequences, i.e., sequences of +1 and −1.

$$s_k^{(1)} = (1 - 2b_k^{(1)})$$

$$s_k^{(2)} = (1 - 2b_k^{(2)}) \quad (1)$$

In some embodiments the modulators 105, 107 can further perform independent quaternary modulation for $b_k^{(1)}$ and $b_k^{(2)}$, which will produce two real-valued symbol sequences $s_k^{(1)}$ and $s_k^{(2)}$ at the respective outputs of the modulators. With quaternary modulation, every two bits $\{b_{2k}^{(1)}, b_{2k+1}^{(1)}\}$ from bit stream $b_k^{(1)}$ are modulated into a real-valued symbol $s_k^{(1)}$, e.g., as shown in the following table.

| $\{b_{2k}^{(1)}, b_{2k+1}^{(1)}\}$ | $s_k^{(1)}$ |
|---|---|
| 00 | +0.4472 |
| 01 | +1.34162 |
| 10 | −0.4472 |
| 11 | −1.34162 |

Similarly, every two bits $\{b_{2k}^{(2)}, b_{2k+1}^{(2)}\}$ from $b_k^{(2)}$ are modulated into a real-valued symbol $s_k^{(2)}$.

The two real-valued symbol sequences, first in phase symbols $s_k^{(1)}$ and second in phase symbols $s_k^{(2)}$ from either binary modulation or quaternary modulation of the two bit streams $b_k^{(1)}$ and $b_k^{(2)}$ are combined via the combiner 109 with multipliers 111, 113, 115, into a complex-valued symbol sequence available at the output of adder 110, $$s_k = w_1 s_k^{(1)} + j w_2 s_k^{(2)} \quad (2)$$

It can be seen that the bit stream $b_k^{(1)}$ and $b_k^{(2)}$ are coded in the in phase or real part and imaginary or quadrature part of the symbol sequence $s_k$, respectively. Since the real part and imaginary part are orthogonal to each other in the modulation described above, this modulation is called orthogonal modulation. FIG. 4 depicts a representative diagram of a constellation map for a quaternary orthogonal modulated signal as has been described above. The first in phase symbols $s_k^{(1)}$ are shown on the horizontal axis 401 and the second in phase symbols $s_k^{(2)}$ are shown on the vertical axis 403. The 8 constellation points represent all possible complex transmit symbols.

In baseband signal processing on the receiver side, a method or algorithm or projection algorithm will be described below to recover the bit stream $b_k^{(1)}$ and $b_k^{(2)}$ separately. To use the projection algorithm, first and second real-valued training sequences $t_k^{(1)}$ and $t_k^{(2)}$ are inserted or appended to the information symbols by the inserters 117, 119, where the first sequence, $t_k^{(1)}$ is for the recovery of $s_k^{(1)}$, and the second sequence, $t_k^{(2)}$ is for the recovery of $s_k^{(2)}$. The two training sequence are combined by the combiner 109, etc. to provide a training symbol as follows $$t_k = w_1 t_k^{(1)} + j w_2 t_k^{(2)} \quad (3)$$

The two training sequences $t_k^{(1)}$ and $t_k^{(2)}$ should have the following characteristics: a) low auto-correlation property, i.e. both $t_k^{(1)}$ and $t_k^{(2)}$ have a pseudo-random property, b) low cross-correlation property, i.e. $t_k^{(1)}$ and $t_k^{(2)}$ are pseudo independent. This can be provided with two pseudo random number generators. The training sequence $t_k$ is used as phase reference and channel estimation in the baseband projection algorithm to recover the bit streams $b_k^{(1)}$ and $b_k^{(2)}$.

The training sequence $t_k$ can be placed in front of the information sequence $s_k$ as in FIG. 3 as mathematically represented in (4).

$$x_k = \begin{cases} t_k, & k = 0, 1, \ldots, K-1 \\ s_k, & k = K, K+1, \ldots, K+N-1 \end{cases} \quad (4)$$

Or in middle of the information sequence $s_k$ as in FIG. 2 as represented in (5).

$$x_k = \begin{cases} s_k, & k = 0, 1, \ldots, \frac{N}{2} - 1 \\ t_{k - \frac{N}{2}}, & k = \frac{N}{2}, \frac{N}{2} + 1, \ldots, \frac{N}{2} + K - 1 \\ s_{k-K}, & k = \frac{N}{2} + K, \ldots, N - 1 + K \end{cases} \quad (5)$$

As in FIG. 1 and as will generally be appreciated, to reduce the peak to average ratio of the signal resulting from the symbol sequence $x_k$, and thus possibly increase Power Amplifier efficiency in RF transmission, the symbol sequence is or may be rotated by ¼-π, using rotator or multiplier 121 and associated phasor as reflected in (6)

$$y_k = e^{j\frac{1}{4}k\pi} x_k \quad (6)$$

In some embodiments the ¼-π rotated symbol sequence then passes through a pulse shaping filter 123 as indicated in (7).

$$y(t) = \sum_k y_k h(t - kT) \quad (7)$$

where h(t) is the pulse shaping filter and T is the symbol duration. Various other functions that will ordinarily be used, e.g., frequency translation to carrier frequency, power amplification, etc., are not shown in FIG. 1 as these are generally appreciated.

Referring to FIG. 5, a representative high level receiver system in accordance with one or more embodiments will be discussed and described. FIG. 5 shows a receiver or receiver system arranged and configured to receive or for receiving a radio frequency signal at, e.g., receiver input or antenna 501, which is an orthogonal modulated signal and demodulating the orthogonal modulated signal. The radio frequency signal at antenna 501 is coupled to a down converter or frequency translator or multiplier 503 that is illustrated as a conversion to baseband frequency by the phasor 505 at carrier frequency, $f_c$. The output of multiplier 503 is the received signal as modulated and will be referred to as a modulated signal.

The receiver includes an analog to digital converter (ADC) that is coupled to the multiplier 503 and the modulated signal and is arranged and configured to convert or for converting the modulated signal to a sampled signal, which is a complex sampled signal with in phase or real samples and quadrature or imaginary samples. Further included is a processor circuitry 509 coupled to the ADC and thus sampled signal and arranged and configured to perform various functions as will be further described. Much or all of the receiver can be an integrated circuit. The processor circuitry can be hardware based or a hardware based or based on a processor together with appropriate software or in may embodiments a combination of both. A digital signal processor is one approach to implementing much of all of the processor.

The processor circuitry 509 or processor 509 as coupled to the ADC 507 via de-rotator 508, is arranged and configured to separate with separator 510 the sampled signal into in phase or real samples at 511 and quadrature or imaginary samples at 512, where the sampled signal as noted above corresponds to the orthogonal modulated signal. It will be appreciated that the sampled signal typically includes one or more training portions and one or more information portions as suggested by FIGS. 2 and 3. Given the in phase and quadrature samples, the processor circuitry is operable, via the equalizer derivation units 513, 515, to derive first equalizer coefficients at 517 and second equalizer coefficients at 519 based on corresponding in phase samples and corresponding quadrature samples and further, respectively, based on a first training sequence at 521 and on a second training sequence at 523. The portion of the sampled signal that corresponds to the training sequences, i.e., the training portion(s) is used to derive the equalizer coefficients. The processor then programs a first plurality of equalizer filters 525 with the first equalizer coefficients and a second plurality of equalizer filters 527 with the second equalizer coefficients. The processor then processes, after the programming, the in phase samples and the quadrature samples through the first and second plurality of equalizer filters to provide demodulated symbols or estimates of the transmitted symbols, $S_k^{(1)}$, $S_k^{(2)}$ at the output of adders 529, 531, respectively. The in phase samples and quadrature samples that are processed by the equalizers correspond to the information portion(s) of the sampled signal. Note that the symbols corresponding to each original bit sequence have been recovered or estimated.

The receiver further comprises the de-rotator 508 which is arranged and configured to de-rotate the sampled signal on a sample by sample basis (e.g., ¼-π derotation) prior to the separating into in phase and quadrature samples. The processor circuitry in varying embodiments is further arranged and configured to derive the first equalizer coefficients by further performing a first Minimum Square Error (MSE) solution to a convolution of the in phase and the quadrature samples and respective sets of the first equalizer coefficients less the first training sequence as will be further discussed below. In some embodiments, the processor circuitry is further arranged and configured to derive the first equalizer coefficients by further performing the first MSE solution at a plurality of time trials and evaluating a performance metric to select a time reference for the first plurality of equalizer filters.

Similarly in some embodiments the processor circuitry is further arranged and configured to derive the second equalizer coefficients by further performing a second Minimum Square Error (MSE) solution to a convolution of the in phase and the quadrature samples and respective sets of the second equalizer coefficients less the second training sequence. The processor circuitry is similarly further arranged and configured to derive the second equalizer coefficients by further performing the second MSE solution at a plurality of time trials and evaluating a second performance metric to select a time reference for the second plurality of equalizer filters. As illustrated in FIG. 5, the processor circuitry is further arranged and configured to process the in phase samples and the quadrature samples by further combining outputs via adder 529 from the first plurality of equalizer filters 525 to provide first demodulated symbols and combining outputs via adder 531 from the second plurality of equalizer filters 527 to provide second demodulated symbols.

In some additional detail and somewhat more rigorously, the received signal having experienced multi-path fading and AWGN contamination in the receiver RF circuit chain can be represented as follows $$r(t) = \sum_{l=1}^{L} \hat{h}_l y(t - \tau_l) + n(t) \qquad (8)$$

Equation (8) represents the multi-path-fading with L paths, $\tau_l$ is the l-th path delay and $\hat{h}_l$ is the attenuation of the l-th path and n(t) is the AWGN.

Some observations that will help with demodulating the received symbols include, from Equations (1) and (2), it can be seen that the bit stream $b_k^{(1)}$ can be recovered from $\text{Re}[s_k]$ and $b_k^{(2)}$ can be recovered from $\text{Im}[s_k]$. The real part and imaginary part are orthogonal to each other; the real part of $s_k$ will have no impact on the recovery of the bit sequence $b_k^{(2)}$, and the imaginary part of $s_k$ will have no impact on the recovery of the bit sequence of $b_k^{(1)}$. Since the transmit symbols come from the same transmitter at the same power the orthogonality can be maintained. Thus the recovery of bit sequence of the $b_k^{(1)}$ and $b_k^{(2)}$ can be made independently. In other words, the recovery of bit sequence $b_k^{(1)}$ can be made without the knowledge of $b_k^{(2)}$, and actually can be made regardless of the existence of the bit sequence $b_k^{(2)}$. The same is true for $b_k^{(2)}$ recovery.

Co-channel interference can be decomposed into two components orthogonal to each other. One component is parallel to the symbol sequence $s_k^{(1)}$ and the other component parallel to the symbol sequence $s_k^{(2)}$. The component parallel to $s_k^{(1)}$ will have no impact on the recovery of the bit sequence $b_k^{(2)}$. Similarly, the component parallel to $s_k^{(2)}$ will have no impact on the recovery of the bit sequence $b_k^{(1)}$. Since the phase of the interference is random relative to the desired signal $s_k$, the interference observed under the projection approach is smaller than its actual power, thus enhancing the interference rejection without the need of multiple antenna receiver configuration.

On the other hand, we also observed that because of the random phase of the received signal, both the real part and imaginary part of the received signal after ¼π r de-rotation can each be used to estimate the transmitted symbol sequence $s_k^{(1)}$ with a real-valued multi-tap equalizer. This is the unique feature of the orthogonal modulation described above. The two estimates of $s_k^{(1)}$ can be combined to produce an improved version of the estimate of $s_k^{(1)}$. This combining can be made to maximize the recovery of $s_k^{(1)}$ or suppression of the second signal $s_k^{(2)}$ and interference. This is the same as the diversity combining in multiple antenna receiver configuration. The real-component and imaginary component of the received complex valued signal in orthogonal modulation are similar to the signals received from two antennas in a two antenna receiver configuration. This interference cancellation is made possible directly due to the orthogonal modulation.

Figure 6:
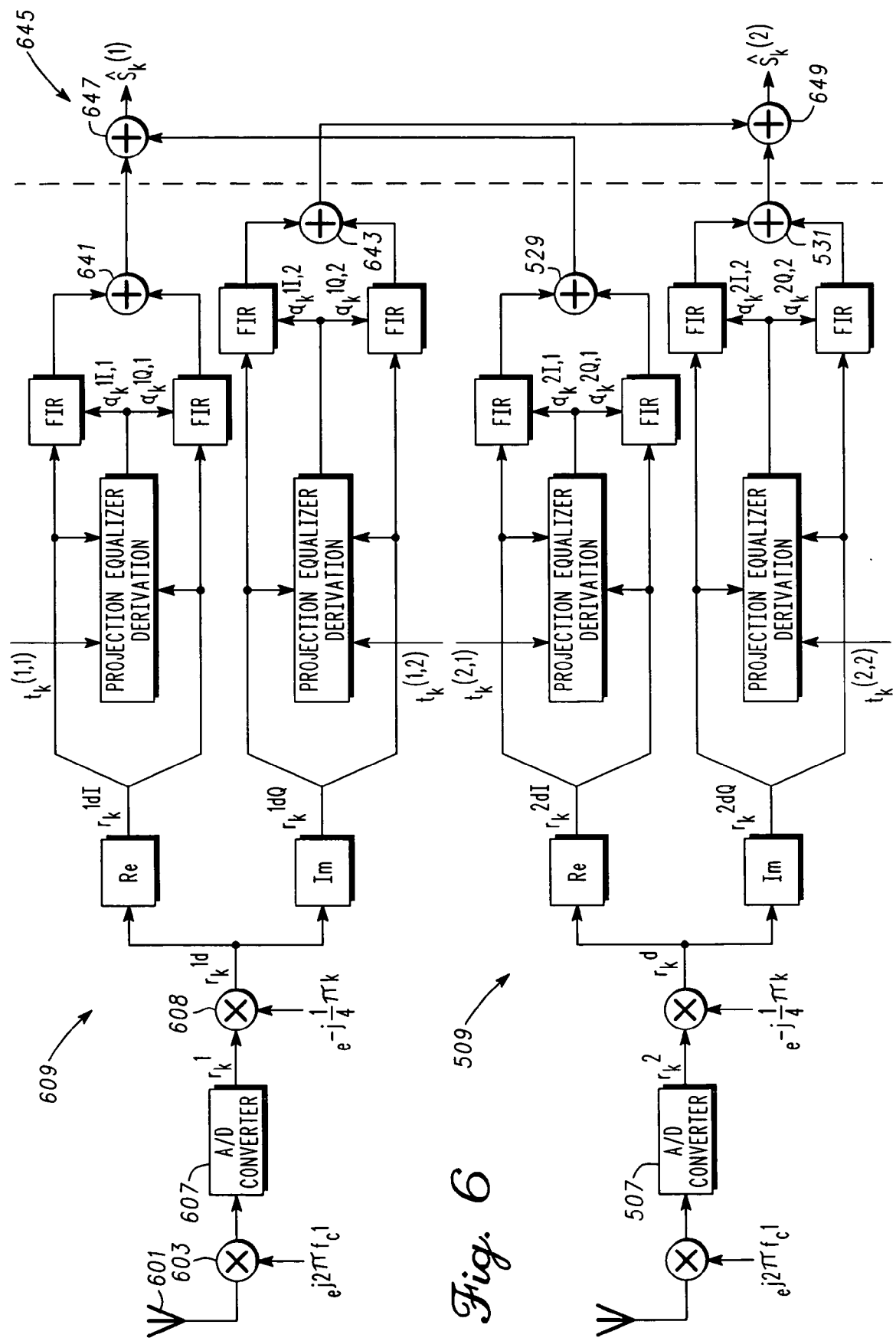
FIG. 6 depicts a further representative high level receiver system in accordance with one or more embodiments.

Actually, this projection receiver as described above can be extended to a multiple antenna receiver configuration with the orthogonal modulation as will be illustrated by FIG. 6. Assume we have a N antenna receiver configuration. The complex valued received signal from each antenna can be decomposed into real and imaginary components. The 2N real-valued components can be considered equally, regardless of whether a component is real or imaginary, and thus can be equalized and combined to produce either an estimate of $s_k^{(1)}$ or an estimate of $s_k^{(2)}$.

In operation the receiver or receiver system of FIG. 5 receives a radio frequency signal which is down converted to a modulated signal. This modulated signal or down converted received signal r(t) is sampled by the ADC 507 at, e.g., the symbol rate or once every symbol duration, T. The sampled digital signal is denoted as $r_k$. The symbol spaced $r_k$ is then de-rotated by $\frac{1}{4}\pi$ every sample assuming it was rotated before transmission. Mathematically, the de-rotation can be described in Equation (9).

$$r_k^d = e^{-j\frac{1}{4}k\pi} r_k \quad (9)$$

Next the sampled signal as a de-rotated signal is split or separated by separator 510 into real or in phase and imaginary or quadrature parts as indicated by (10). Note this amounts to selecting the real or imaginary part of a complex number, typically from some form of memory.

$$\begin{cases} r_k^{dI} = \mathrm{Re}[r_k^d] \\ r_k^{dQ} = \mathrm{Im}[r_k^d] \end{cases} \quad (10)$$

Given the real or in phase and imaginary or quadrature samples these together with the appropriate first or second training symbol sequence are provided to the equalizer derivation units 513, 515, respectively. Different from conventional equalizers which are of complex-valued taps and applied to the complex-valued received signal, the equalizer in projection receiver is a set of two real-valued equalizers applied to the two real-valued components $\{r_k^{dI}, r_k^{dQ}\}$ of the complex-valued received signal after the $\frac{1}{4}\pi$ r de-rotation. The sum of the two equalizer outputs, which are two real-valued signals, is the projection equalizer output or the recovered symbol stream corresponding the bit stream $b_k^{(1)}$ or $b_k^{(2)}$. If the equalizer is derived based on the training sequence $t_k^{(1)}$, the equalizer output will be the estimate of $S_k^{(1)}$; otherwise is the estimate of $S_k^{(2)}$.

Denote the set of two real-valued equalizers (first plurality of filters 525 as programmed) for the estimate of $S_k^{(1)}$ by $\{a_k^{I1}, a_k^{Q1}\}$, and the set of two real-valued equalizers (second plurality of filters 527 as programmed) for the estimate of $S_k^{(2)}$ by $\{a_k^{I1}, a_k^{Q2}\}$. The joint Minimum Square Error (MSE) solution to each of the two sets of real-valued equalizers can be given by the following $$\|a_k I1 * r_k^{dI} + a_k^{Q1} * r_k^{dQ} - t_k^{(1)}\|^2 \to \min \quad (12a)$$

$$\|a_k^{I2} * r_k^{dI} + a_k^{Q2} * r_k^{dQ} - t_k^{(2)}\|^2 \to \min \quad (12b)$$

The joint MSE problem (12a) can be written in matrix form (12c), assuming the training sequence $t_k^{(1)}$ has M+1 symbols, each of the equalizers $a_k^{I1}, a_k^{Q1}$ has N+1 taps, and k is the time reference of the de-rotated signal.

$$\begin{bmatrix} r_k^{dI} & r_{k-1}^{dI} & \cdots & r_{k-N}^{dI} & r_k^{dQ} & r_{k-1}^{dQ} & \cdots & r_{k-N}^{dQ} \\ r_{k+1}^{dI} & r_k^{dI} & \cdots & r_{k-N+1}^{dI} & r_{k+1}^{dQ} & r_k^{dQ} & \cdots & r_{k-N+1}^{dQ} \\ \cdots & \cdots & \cdots & \cdots & \cdots & \cdots & \cdots & \cdots \\ r_{k+M}^{dI} & r_{k+M+1}^{dI} & \cdots & r_{k+M-N}^{dI} & r_{k+M}^{dQ} & r_{k+M+1}^{dQ} & \cdots & r_{k+M-N}^{dQ} \end{bmatrix} \begin{bmatrix} a_0^{I1} \\ a_1^{I1} \\ \vdots \\ a_N^{I1} \\ a_0^{Q1} \\ a_1^{Q1} \\ \vdots \\ a_N^{Q1} \end{bmatrix} \approx \begin{bmatrix} t_0^{(1)} \\ t_1^{(1)} \\ \vdots \\ t_M^{(1)} \end{bmatrix} \quad (12c)$$

In matrix notation, the MSE problem (12c) can be written as $r_k^{dI} a \to t^{(1)}$, where a is the equalizer, $r_k^{dI}$ is the received signal convolution matrix, and $t^{(1)}$ is the desired output or result, which is the training sequence vector. This MSE problem can be solved by $(r_k^{dI})^T r_k^{dI} a = (r_k^{dI})^T t^{(1)}$. Similar approaches can be used to solve (12b) and (15) below.

The received signal $\{r_k^{dI}, r_k^{dQ}\}$ in Equation (12) is within the training sequence search window. For each timing trial, the equation (12) needs to be solved for the equalizers, and a performance metric needs to be calculated at each timing trial. The timing at which the best performance metric is achieved will be considered as the best timing. The performance metric can be as follows $$E_1 = \|a_k^{I1} * r_k^{dI} + a_k^{Q1} * r_k^{dQ} - t_k^{(1)}\|^2 \quad (13a)$$

$$E_2 = \|a_k^{I2} * r_k^{dI} + a_k^{Q2} * r_k^{dQ} - t_k^{(2)}\|^2 \quad (13b)$$

It is important to point out that the timing search for one set of equalizers can be independent of the search of the other set, thus in general resulting in two best timing.

This best timing and the corresponding equalizers will be used to equalize the received signal to produce the estimates of $S_k^{(1)}$ and $S_k^{(2)}$ as reflected in (14).

$$\begin{cases} \hat{s}_k^{(1)} = a_k^{I1} * r_k^{dI} + a_k^{Q1} * r_k^{dQ} \\ \hat{s}_k^{(2)} = a_k^{I2} * r_k^{dI} + a_k^{Q2} * r_k^{dQ} \end{cases} \quad (14)$$

In operation, the receiver of FIG. 5 and to be discussed FIG. 6 receives a frame or block of information along with the training bit sequence including a few extra samples or enough samples to span the frame width and a few extra times the symbol duration T. Given these samples, and a selected portion thereof corresponding to the timing information equation (12) is solved to provide or derive sets of equalizer coefficients and equation (13) is solved to provide or compute corresponding performance metrics for these sets of equalizer coefficients. A new time base is then used, i.e., a new set of samples corresponding to the training information (usually be sliding one sample left or right) is used to repeat the equalizer coefficient derivation or solution from (12) with new performance metrics determined from (13). This is repeated, e.g., 3 to 5 times, each time with a new set of samples and the resulting equalizer coefficients that yield the best, e.g., smallest or lowest, performance metric are utilized along with the corresponding timing to program the equalizer filters and to process the information portion of the samples, thereby providing demodulated symbols for the corresponding frame. This process is repeated for each frame of the received signal.

Referring to FIG. 6, a further representative high level receiver system in accordance with one or more embodiments will be discussed and described. FIG. 6 shows a receiver or receiver system that employs a plurality of antennas or receiver inputs, ordinarily referred to as a multiple antenna or diversity receiver. By observation all elements of FIG. 5 are replicated including the ADC 507 and processor circuitry 509 and all of these elements operate analogously to those discussed with reference to FIG. 5.

Additionally a second copy of all elements are provided including a second receiver antenna or input 601 and multiplier 607 for frequency translation and a second ADC 608 for sampling a second (copy of the other) modulated signal to provide a second sampled signal with second in phase and quadrature samples and a second processor circuitry 609 which duplicates all functions of processor circuitry 509 but uses the second in phase and quadrature samples from the second ADC 608 to derive equalizer coefficients (eq (12)) and provide second demodulated symbols at the outputs of adders or combiners 641, 643.

An additional combiner or combiners 645 combines or add the demodulated symbols and second demodulated symbols to provide improved demodulated symbols with the improvement corresponding to that expected for diversity reception. More specifically combiner or adder 647 adds or combines the demodulated symbols and second demodulated symbols that correspond to the first symbol stream $S_k^{(1)}$ to provide improved demodulated symbols or improved symbol estimates for the first symbol stream and the adder 649 combines the demodulated symbols and second demodulated symbols that correspond to the second symbol stream $S_k^{(2)}$ to provide improved demodulated symbols or improved estimates for the second symbol stream.

More rigorously, with a N-antenna or input receiver configuration, the N complex-valued received signals from the N antennas are sampled at the symbol rate and, if needed ¼-π de-rotated and split into real and imaginary parts, resulting in 2N real-valued signals. As is discussed early, with the orthogonal modulation, the 2N components of received signal can be treated equally that each of the 2N components can be considered as a received signal from one antenna, and each can be equalized to produce an estimate of $S_k^{(1)}$ or $S_k^{(2)}$. The set of real-valued equalizers to estimate the symbol sequence $S_k^{(1)}$ is as follows $$\left\| \sum_{j=1}^{N} (a_k^{I1,j} * r_k^{dI,j} + a_k^{Q1,j} * r_k^{dQ,j}) - t_k^{(1)} \right\|^2 \to \min \quad (15a)$$

where j is the antenna index. Similarly, the set of real-valued equalizers to estimate the symbol sequence $S_k^{(2)}$ can be give as follows $$\left\| \sum_{j=1}^{N} (a_k^{I2,j} * r_k^{dI,j} + a_k^{Q2,j} * r_k^{dQ,j}) - t_k^{(2)} \right\|^2 \to \min \quad (15b)$$

The calculated equalizers from solving the MSE problem (15) will be applied to the received signal as follows to produce the second demodulated symbols or estimate of $S_k^{(1)}$ or $S_k^{(2)}$ at the output of adders 641, 643 respectively.

$$\begin{cases} \hat{s}_k^{(1)} = \sum_{j=1}^{N} a_k^{I1,j} * r_k^{dI,j} + a_k^{Q1,j} * r_k^{dQ,j} \\ \hat{s}_k^{(2)} = \sum_{j=1}^{N} a_k^{I2,j} * r_k^{dI,j} + a_k^{Q2,j} * r_k^{dQ,j} \end{cases} \quad (16)$$

As noted above these can be added to the other estimates or demodulated symbols at the output of adders 529, 531 to provide improved demodulated symbols or estimated symbols.

Thus FIG. 6 shows a receiver that in addition to the receiver of FIG. 5 illustrates a receiver with a second ADC 607 coupled to a second receiver input 603 for converting a second modulated signal to a second sampled signal with second in phase samples and second quadrature samples, a second processor 609 coupled to the second ADC and arranged and configured to duplicate the operations of the processor 507 after substituting the second in phase samples for the in phase samples and after substituting the second quadrature samples for the quadrature samples to provide second demodulated symbols; and additional combiners to combine the demodulated symbols and second demodulated symbols to provide improved demodulated symbols.

Thus the sampled signal of FIG. 6 includes a first sampled signal as in FIG. 5 from a first receiver input and a second sampled signal from a second receiver input and the separating a sampled signal includes separating the first and second sampled signal into respective first and second in phase and quadrature samples and wherein the second in phase and quadrature samples are used for deriving third and fourth equalizer coefficients used for programming a third and fourth plurality of equalizer filters with these filters used for processing the second in phase and quadrature samples, respectively to provide second demodulated symbols, wherein the demodulated symbols and the second demodulated symbols are combined to provide improved demodulated symbols.

Figure 7:
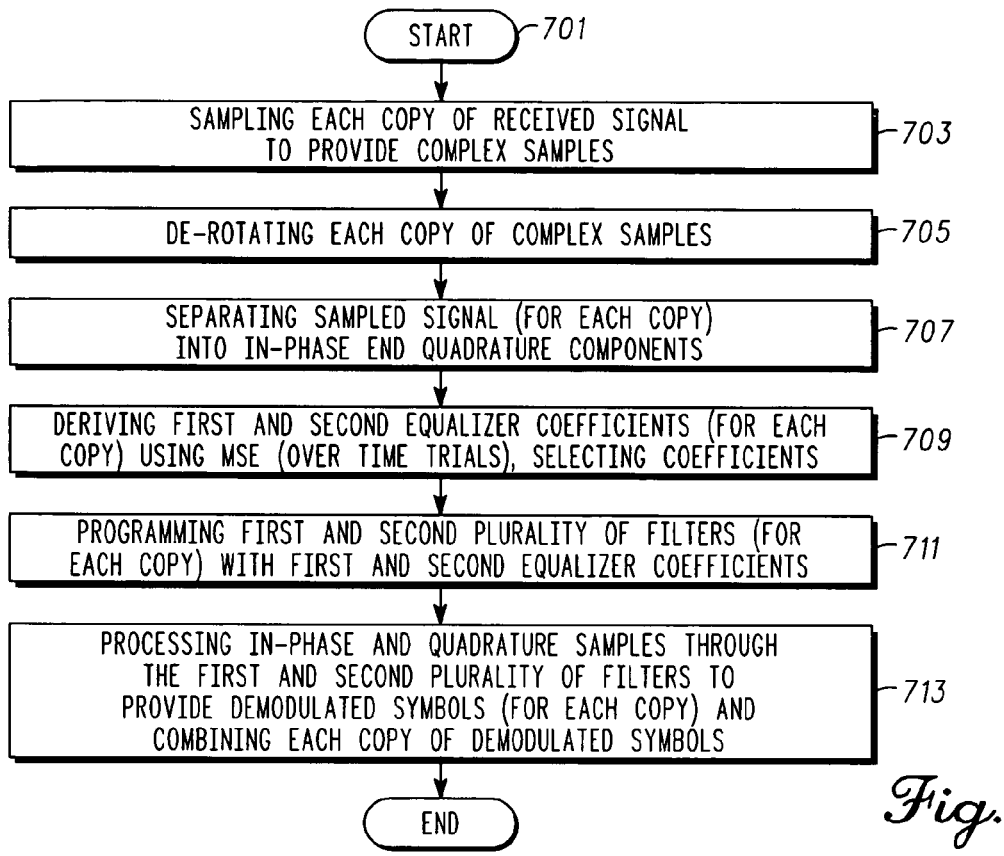
FIG. 7 illustrates a method of demodulating an orthogonal modulated signal in accordance with one or more embodiments.

Referring to FIG. 7 a method of demodulating an orthogonal modulated signal in accordance with one or more embodiments will be discussed and described. It will be appreciated that this method uses many of the inventive concepts and principles discussed in detail above and thus this description will be somewhat in the nature of a summary with various details generally available in the earlier descriptions. This method can be implemented in one or more of the structures or apparatus described earlier or other similarly configured and arranged structures. FIG. 7 shows a method that starts at 701 and will be repeated as needed, typically for each frame that is received and processed. At 703 sampling, e.g., by respective ADCs, of each copy of the received signal or demodulated signal is preformed to provide a sampled signal which is a complex digital signal. Next, as and if needed a derotation 705 of each sample for each copy of the sampled signal is performed, with e.g. ¼π derotation per sample.

The method of demodulating an orthogonal modulated signal then proceeds to 707 where separating a sampled signal, (each copy from each receiver input of the sampled signal) into in phase samples and quadrature samples, with the sampled signal corresponding to the orthogonal modulated signal. Given the in phase and quadrature samples the method illustrates deriving 709 first equalizer coefficients and second equalizer coefficients based on corresponding in phase samples and corresponding quadrature samples and further, respectively, based on a first training sequence and on a second training sequence for each copy of the samples.

The deriving 709 equalizer coefficients can further comprise performing a first Minimum Square Error (MSE) solution to a convolution of the in phase and the quadrature samples and respective sets of the first equalizer coefficients less the first training sequence and this may be repeated by performing the first MSE solution at a plurality of time trials and evaluating a performance metric to select a time reference for the first plurality of equalizer filters. Basically for the in phase and quadrature samples of the received signal that are supposed to be training samples a set of equalizer coefficients are derived in accordance with eq (12a, 12b) and then a different set of in phase and quadrature samples are used (typically by moving one sample left or right one or two times each) and repeating the solution to (12a), (12b). From all of these time trials or sets of samples, the equalizer coefficients that provide the best performance metric according the eq (13) is used for the equalizers.

This deriving 709 is repeated for the second equalizer, i.e., the deriving second equalizer coefficients further comprises performing a second Minimum Square Error (MSE) solution to a convolution of the in phase and the quadrature samples and respective sets of the second equalizer coefficients less the second training sequence and this can include performing the second MSE solution at a plurality of time trials and evaluating a second performance metric to select a time reference for the second plurality of equalizer filters.

The method further includes programming 711 a first plurality of equalizer filters with the first equalizer coefficients and a second plurality of equalizer filters with the second equalizer coefficients again for each copy of the sampled signal.

The method can include 713 processing, after the programming, the in phase samples and the quadrature samples, which correspond to information symbols through the first and second plurality of equalizer filters to provide demodulated symbols. The processing the in phase samples and the quadrature samples can further comprise combining outputs from the first plurality of equalizer filters to provide first demodulated symbols and combining outputs from the second plurality of equalizer filters to provide second demodulated symbols for each copy.

The processing and combining can be further extended such that each copy of the demodulated symbols corresponding to each copy of the received or demodulated signal and thus copy of the sampled signal are combined to provide improved demodulated symbols or improved estimates of the received symbols. Thus the method extends to situations wherein the sampled signal includes a first sampled signal from a first receiver input and a second sampled signal from a second receiver input and the separating a sampled signal includes separating the first and second sampled signal into respective first and second in phase and quadrature samples and wherein the second in phase and quadrature samples are used for deriving third and fourth equalizer coefficients used for programming a third and fourth plurality of equalizer filters with these filters used for processing the second in phase and quadrature samples, respectively to provide second demodulated symbols, wherein the demodulated symbols and the second demodulated symbols are combined to provide improved demodulated symbols.

Figure 8:
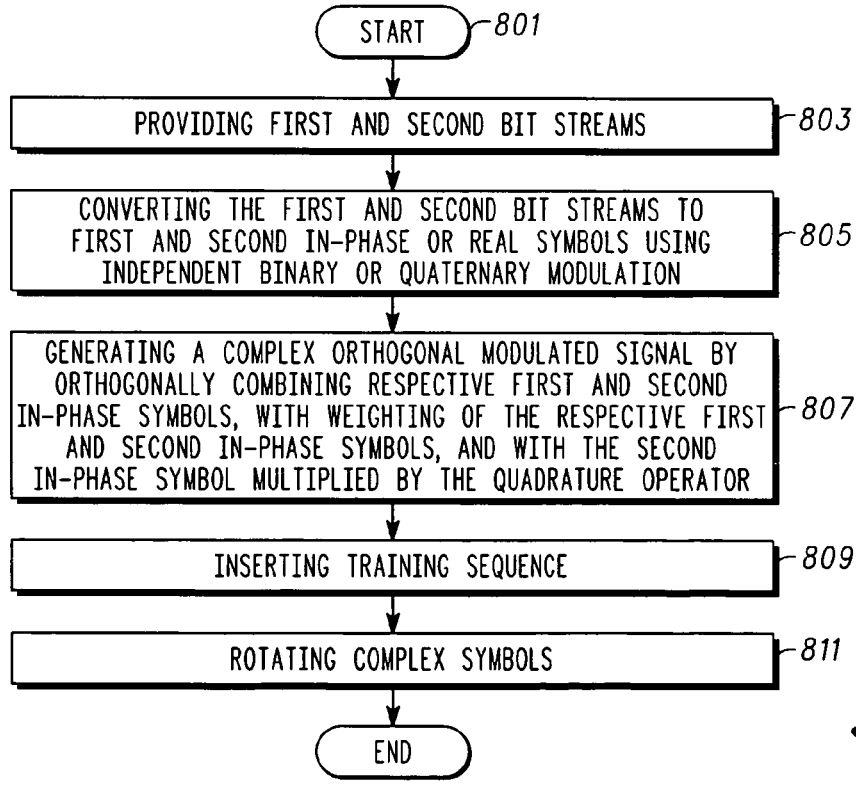
FIG. 8 illustrates a method of providing an orthogonal modulated signal in accordance with one or more embodiments.

Referring to FIG. 8 a method of providing an orthogonal modulated signal in accordance with one or more embodiments will be discussed and described. Again, it will be appreciated that this method uses many of the inventive concepts and principles discussed in detail above and thus this description will be somewhat in the nature of a summary with various details generally available in the earlier descriptions. This method can be implemented in one or more of the structures or apparatus described earlier or other similarly configured and arranged structures. FIG. 8 shows a method of providing an orthogonal modulated signal using a plurality of bit streams, with the method starting at 801 and comprising: providing 803 a first bit stream and providing a second bit stream; converting 805 the first bit stream to first in phase symbols and the second bit stream to second in phase symbols; and generating 807 a complex orthogonal modulated signal by orthogonally combining respective ones of the first in phase symbols and the second in phase symbols.

The converting 805 the first bit stream to first in phase symbols and the second bit stream to second in phase symbols can further comprise assigning symbols using independent quaternary modulation or independent binary modulation. The assigning symbols using independent quaternary modulation may further comprise independently assigning one of four real value symbols to each pair of bits in the first bit stream and in the second bit stream.

The generating 807 a complex orthogonal modulated signal can further comprise weighting each of the first in phase symbols and each of the second in phase samples with respective first and second weights. The generating a complex orthogonal modulated signal may also further comprises multiplying each of the second in phase samples by the quadrature operator to thereby provide the orthogonality between the first and second in phase samples.

The method of FIG. 8 may further comprise inserting a first training symbol sequence in the first in phase symbols and a second training symbol sequence in the second in phase symbols prior to the orthogonal combining or inserting a complex training sequence after the orthogonal combining. Thus in some embodiments the method may further comprise inserting a first and a second training symbol sequence, respectively in the first and second in phase symbols; wherein the converting the first bit stream to first in phase symbols and the second bit stream to second in phase symbols further comprises assigning symbols using independent quaternary modulation, which further comprises independently assigning one of four real value symbols to each pair of bits in the first bit stream and in the second bit stream; wherein the generating a complex orthogonal modulated signal further comprises weighting each of the first and second in phase symbols with respective first and second weights and multiplying each of the second in phase samples by the quadrature operator, thereby providing orthogonality between the first and second in phase samples, and then sequentially selecting each of the first in phase symbols and corresponding each of the second in phase symbols as multiplied by the quadrature operator to provide the in phase and quadrature portions of a complex orthogonal modulated symbol.

Furthermore the complex information and training symbols can be rotated 811 by, e.g. $\frac{1}{4}\pi$ or the like, prior to transmission and the complex symbols can be filtered or shaped as appropriate. The method of FIG. 8 can be repeated as needed, e.g., typically for each frame of transmitted information.

It will be appreciated that the above described functions and structures may be implemented in one or more integrated circuits. For example, many or all of the functions can be implemented in signal processing circuitry such as that variously indicated by FIG. 1, FIG. 5 and FIG. 6.

The processes, apparatus, and systems, discussed above, and the inventive principles thereof are intended to and can alleviate or mitigate co-channel interference or increase capacity for a given level of interference and other issues caused by prior art techniques. Using these principles of true orthogonal modulation at the transmitter can quickly yield an accurate estimate of recovered or demodulated symbols at a receiver with relatively minimal costs and the like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of demodulating an orthogonal modulated signal, the method comprising:
   separating a sampled signal including a training portion and an information portion into in phase samples and quadrature samples, the sampled signal corresponding to the orthogonal modulated signal;
   deriving first equalizer coefficients and second equalizer coefficients based on the training portion and corresponding in phase samples and corresponding quadrature samples and further, respectively, based on a first training sequence and on a second training sequence;
   programming a first plurality of equalizer filters with the first equalizer coefficients and a second plurality of equalizer filters with the second equalizer coefficients; and
   processing, after the programming, the in phase samples and the quadrature samples from the information portion through the first and second plurality of equalizer filters to provide demodulated symbols.

2. The method of claim 1 wherein the sampled signal is first de-rotated on a sample by sample basis prior to the separating into in phase and quadrature samples.

3. The method of claim 1 wherein the deriving first equalizer coefficients further comprises performing a first Minimum Square Error (MSE) solution to a convolution of the in phase and the quadrature samples and respective sets of the first equalizer coefficients less the first training sequence.

4. The method of claim 3 wherein the deriving first equalizer coefficients further comprises, performing the first MSE solution at a plurality of time trials and evaluating a performance metric to select a time reference for the first plurality of equalizer filters.

5. The method of claim 3 wherein the deriving second equalizer coefficients further comprises performing a second Minimum Square Error (MSE) solution to a convolution of the in phase and the quadrature samples and respective sets of the second equalizer coefficients less the second training sequence.

6. The method of claim 5 wherein the deriving second equalizer coefficients further comprises performing the second MSE solution at a plurality of time trials and evaluating a second performance metric to select a time reference for the second plurality of equalizer filters.

7. The method of claim 1 wherein the processing the in phase samples and the quadrature samples further comprises combining outputs from the first plurality of equalizer filters to provide first demodulated symbols and combining outputs from the second plurality of equalizer filters to provide second demodulated symbols.

8. The method of claim 1 wherein the sampled signal includes a first sampled signal from a first receiver input and a second sampled signal from a second receiver input and the separating a sampled signal includes separating the first and second sampled signal into respective first and second in phase and quadrature samples and wherein the second in phase and quadrature samples are used for deriving third and fourth equalizer coefficients used for programming a third and fourth plurality of equalizer filters with these filters used for processing the second in phase and quadrature samples, respectively to provide second demodulated symbols, wherein the demodulated symbols and the second demodulated symbols are combined to provide improved demodulated symbols.

9. A method of providing an orthogonal modulated signal using a plurality of bit streams, the method comprising:
   providing a first bit stream and providing a second bit stream;
   converting, in a first processor, the first bit stream to first in phase symbols and the second bit stream to second in phase symbols;
generating, in a second processor, a complex orthogonal modulated signal by orthogonally combining respective ones of the first in phase symbols and the second in phase symbols.

10. The method of claim 9 wherein the generating a complex orthogonal modulated signal further comprises weighting each of the first in phase symbols and each of the second in phase samples with respective first and second weights.

11. The method of claim 9 wherein the generating a complex orthogonal modulated signal further comprises multiplying each of the second in phase samples by the quadrature operator to thereby provide the orthogonality between the first and second in phase samples.

12. The method of claim 9 wherein the converting the first bit stream to first in phase symbols and the second bit stream to second in phase symbols further comprises assigning symbols using independent quaternary modulation.

13. The method of claim 12 wherein the assigning symbols using independent quaternary modulation further comprises independently assigning one of four real value symbols to each pair of bits in the first bit stream and in the second bit stream.

14. The method of claim 9 further comprising inserting a first training symbol sequence in the first in phase symbols and a second training symbol sequence in the second in phase symbols.

15. The method of claim 9 further comprising inserting a first and a second training symbol sequence, respectively in the first and second in phase symbols;
   wherein the converting the first bit stream to first in phase symbols and the second bit stream to second in phase symbols further comprises assigning symbols using independent quaternary modulation, which further comprises independently assigning one of four real value symbols to each pair of bits in the first bit stream and in the second bit stream;
   wherein the generating a complex orthogonal modulated signal further comprises weighting each of the first and second in phase symbols with respective first and second weights and multiplying each of the second in phase samples by the quadrature operator, thereby providing orthogonality between the first and second in phase samples, and then sequentially selecting each of the first in phase symbols and corresponding each of the second in phase symbols as multiplied by the quadrature operator to provide the in phase and quadrature portions of a complex orthogonal modulated symbol.

16. A receiver for demodulating an orthogonal modulated signal, the receiver comprising:
    an analog to digital converter (ADC) for converting a modulated signal to a sampled signal with in phase samples and quadrature samples; and
    a processor circuitry coupled to the ADC and arranged and configured to:
        separate the sampled signal into in phase samples and quadrature samples, the sampled signal corresponding to the orthogonal modulated signal;
        derive first equalizer coefficients and second equalizer coefficients based on corresponding in phase samples and corresponding quadrature samples and further, respectively, based on a first training sequence and on a second training sequence;
        program a first plurality of equalizer filters with the first equalizer coefficients and a second plurality of equalizer filters with the second equalizer coefficients; and
        process, after the programming, the in phase samples and the quadrature samples through the first and second plurality of equalizer filters to provide demodulated symbols.

17. The receiver of claim 16 wherein the receiver further comprises a de-rotator to de-rotate the sampled signal on a sample by sample basis prior to the separating into in phase and quadrature samples.

18. The receiver of claim 16 wherein the processor circuitry is further arranged and configured to derive the first equalizer coefficients by further performing a first Minimum Square Error (MSE) solution to a convolution of the in phase and the quadrature samples and respective sets of the first equalizer coefficients less the first training sequence.

19. The receiver of claim 18 wherein the processor circuitry is further arranged and configured to derive the first equalizer coefficients by further performing the first MSE solution at a plurality of time trials and evaluating a performance metric to select a time reference for the first plurality of equalizer filters.

20. The receiver of claim 18 wherein the processor circuitry is further arranged and configured to derive the second equalizer coefficients by further performing a second Minimum Square Error (MSE) solution to a convolution of the in phase and the quadrature samples and respective sets of the second equalizer coefficients less the second training sequence.

21. The receiver of claim 20 wherein the processor circuitry is further arranged and configured to derive the second equalizer coefficients by further performing the second MSE solution at a plurality of time trials and evaluating a second performance metric to select a time reference for the second plurality of equalizer filters.

22. The receiver of claim 16 wherein the processor circuitry is further arranged and configured to process the in phase samples and the quadrature samples by further combining outputs from the first plurality of equalizer filters to provide first demodulated symbols and combining outputs from the second plurality of equalizer filters to provide second demodulated symbols.

23. The receiver of claim 16 further comprising:
    a second ADC coupled to a second receiver input for converting a second modulated signal to a second sampled signal with second in phase samples and second quadrature samples,
    a second processor circuitry coupled to the second ADC and arranged and configured to duplicate the operations of the processor circuitry after substituting the second in phase samples for the in phase samples and after substituting the second quadrature samples for the quadrature samples to provide second demodulated symbols; and
    additional combiners to combine the demodulated symbols and second demodulated symbols to provide improved demodulated symbols.

* * * * *